United States Patent
Yoshihara

(10) Patent No.: US 7,472,717 B2
(45) Date of Patent: Jan. 6, 2009

(54) FLOAT VALVE

(75) Inventor: Koichi Yoshihara, Fujisawa (JP)

(73) Assignee: NOK Corporation, Tokyo (JP)

(*) Notice: Subject to any disclaimer, the term of this patent is extended or adjusted under 35 U.S.C. 154(b) by 202 days.

(21) Appl. No.: 10/579,340

(22) PCT Filed: Nov. 1, 2004

(86) PCT No.: PCT/JP2004/016223

§ 371 (c)(1),
(2), (4) Date: May 15, 2006

(87) PCT Pub. No.: WO2005/047686

PCT Pub. Date: May 26, 2005

(65) Prior Publication Data

US 2008/0029070 A1 Feb. 7, 2008

(30) Foreign Application Priority Data

Nov. 14, 2003 (JP) ............................. 2003-385262

(51) Int. Cl.
*F16K 31/18* (2006.01)
(52) U.S. Cl. .................. 137/202; 137/43; 137/587; 251/64
(58) Field of Classification Search ............ 137/39, 137/43, 202, 411, 423, 587, 601.13, 601.01; 123/516, 518; 251/64
See application file for complete search history.

(56) References Cited

U.S. PATENT DOCUMENTS

| 5,065,782 A | * | 11/1991 | Szlaga | 137/39 |
| 5,261,439 A | * | 11/1993 | Harris | 137/43 |
| 5,443,561 A | * | 8/1995 | Sakata et al. | 137/202 |
| 5,590,697 A | * | 1/1997 | Benjey et al. | 137/202 |
| 2001/0050104 A1 | * | 12/2001 | Nishi et al. | 137/202 |
| 2002/0144730 A1 | * | 10/2002 | Brock et al. | 137/202 |

FOREIGN PATENT DOCUMENTS

| JP | 08-114274 | 5/1996 |
| JP | 2002-115613 | 4/2002 |
| JP | 2003-185046 | * 7/2003 |

* cited by examiner

*Primary Examiner*—John Rivell
*Assistant Examiner*—Craig Price
(74) *Attorney, Agent, or Firm*—Jacobson Holman PLLC

(57) ABSTRACT

A first valve port is set to have a seal diameter smaller than that of a second valve port. Due to a pressure reception area of a first valve body port being small, the attachment force of the first valve body portion is reduced with respect to a valve seat. It thus becomes possible to open the first valve port as the attachment of the first valve body portion is released with respect to the valve seat without increasing the weight of the float. After the first valve port is opened, the pressure difference is reduced between inside of a fuel tank and a connecting pipe on the side of a canister, and the attachment force acting on a second valve body portion is also reduced. In this manner, the second valve body portion is opened with certainty. As a result, it becomes possible to go through the operation of opening the second valve port that is larger in diameter than the first valve port without increasing the weight of a sub float.

1 Claim, 5 Drawing Sheets

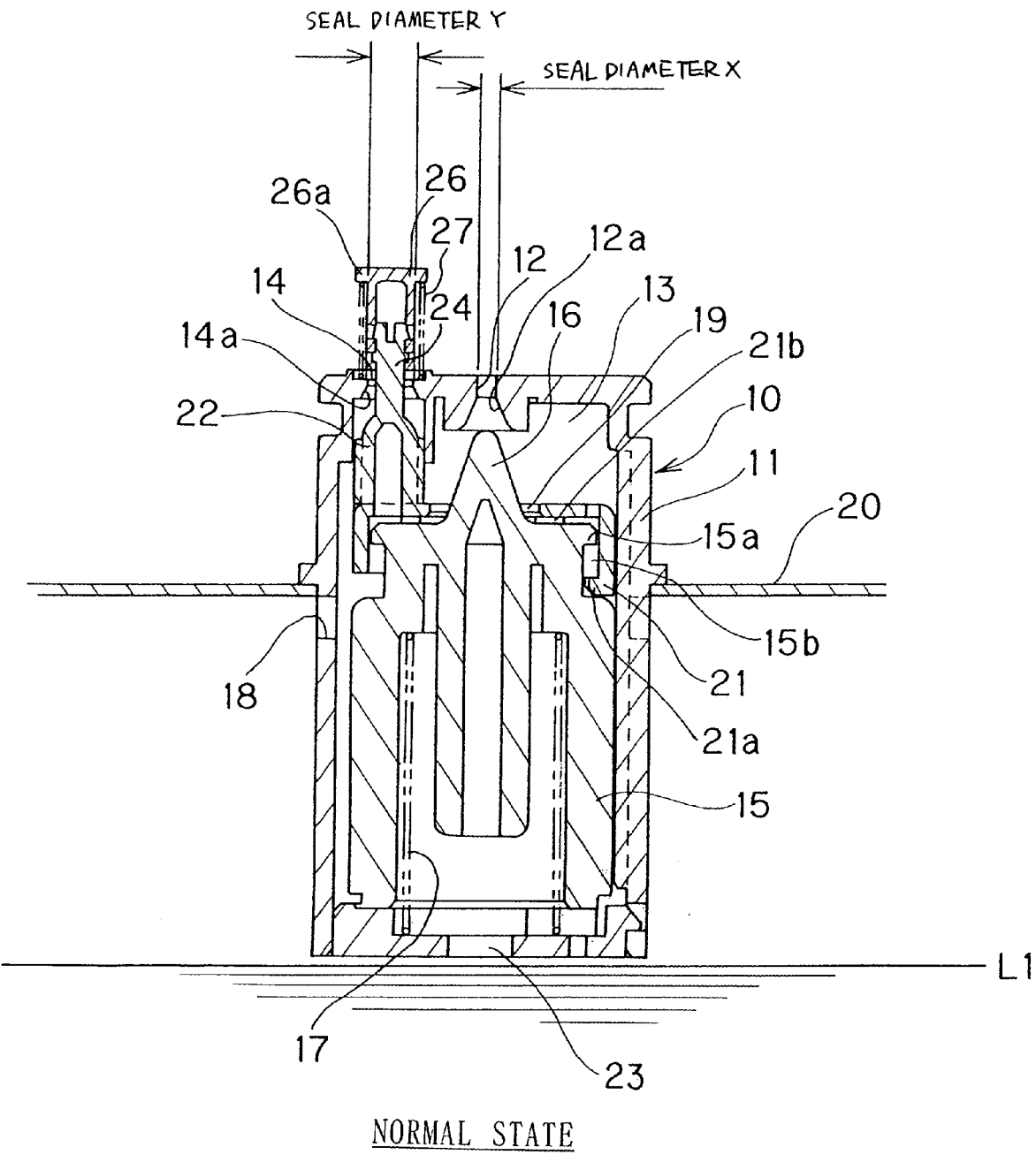

CLOSED STATE

MAIN FLOAT OPEN

PRIOR ART

FLOAT VALVE

TECHNICAL FIELD

The present invention relates to a float valve for guiding, to a canister, fuel gas to be generated in a fuel tank of a vehicle.

BACKGROUND ART

In a vehicle, as shown in FIG. 5, a float valve 100 is provided to the upper part of a fuel tank 200 for guiding, to a canister 300, fuel gas to be generated in the fuel tank. The float valve 100 and the canister 300 are connected to each other by a connecting pipe 400, and the fuel gas of the fuel tank 200 is guided to the canister 300. This float valve 100 eases the rapid increase of internal pressure of the fuel tank 200, and prevents a back flow of the fuel from a fuel filler opening 250.

Here, the float valve of a conventional type is shown in FIG. 6.

The conventional float valve 100 is provided with a case 101 having a space formed inside, a valve port 102 that opens toward the upper surface of the case 101, a float 105 to be housed in a space 103 of the case 101 to freely move therein, a valve body portion 106 that is formed to protrude from the upper surface of the float 105 so as to close the valve port 102, a spring 107 that is provided inside of the float 105 so as to bias the float 105 upward, and a vent 108 that is formed on the side surface of the case.

To the upper part of the case 101, a connecting pipe that is not shown is connected for guiding the fuel gas to a canister that is not shown. Herein, although the spring 107 always biases upward the float 105 with a load smaller than the self weight of the float 105, it does not push up the upright float 105 unless the buoyant force acts.

In the below, the movement of such a float valve 100 is described.

As shown in FIG. 6, when a fuel level L is located at a lower position, the float 105 moves down due to its self weight, and is located at the lower position in the case 101. Therefore, the valve body portion 106 is sufficiently away from the valve port 102.

In this state, the valve body portion 106 does not interrupt the connection between the space 103 of the case 101 and the connecting pipe 400 to the canister 300, and the fuel gas generated inside of the fuel tank 200 is guided from the vent 108 to the canister 300 via the space 103 and the connecting pipe 400. With such a structure, the internal pressure of the tank can be appropriately maintained, and the fuel supply can be performed in a safe and stable manner.

Next, when the liquid surface of the fuel exceeds a predetermined level in the fuel tank 200 due to a fuel increase in the fuel tank 200 as a result of fuel supply, too much banking of a vehicle, or overturning thereof, the float 105 moves up by receiving the buoyant force, and the valve body portion 106 closely attaches to the valve port 102 so that it becomes in the valve-closed state. Thereby, the fuel leakage is prevented (refer to Patent Document 1, for example).

However, such a conventional float valve as above is required to have the valve port 102 of a large diameter for the purpose of exhausting the fuel gas with efficiency to reduce the pressure loss at the time of fuel supply, for example. As a result, the valve body portion 106 is also increased in diameter.

The issue here is that when the liquid surface inside of the fuel tank 200 moves down, the float 105 moves down due to its self weight (the load derived by subtracting the spring's biasing force from the self weight of the float itself). When the pressure in the fuel tank 200 differs a lot from the pressure in the connecting pipe 400 on the side of the canister 300, and when the pressure in the fuel tank 200 is higher, the upward force acting on the valve body portion 106 exceeds the self weight of the float 105, causing such a trouble that the valve is prevented from opening and the valve body portion 106 is attached to the valve port 102. Such an attachment force of the valve body portion 106 with respect to the valve port 102 is increased proportionate to the pressure reception area of the valve body portion 106.

Therefore, when the liquid surface inside of the fuel tank 200 moves down, the float 105 is supposed to go down due to its self weight and open the valve body portion 106. However, when the valve port 102 and the valve body portion 106 are both increased in diameter as described above, it may possibly cause a problem that the attachment force of the valve body portion 106 is increased with respect to the valve port 102, and even if the liquid surface is lowered, the valve body portion 106 is not released from the valve port 102 and thus is not opened.

Here, in order to solve such an attachment problem of the valve body portion 106, proposed is a float valve with which the open valve characteristics can be stably maintained even if the pressure reception area of the valve body portion 106 is increased by preventing attachment through increase of the weight of the float 105 (as an example, refer to Patent Document 2).

Patent Document 1: JP-A-2002-115613
Patent Document 2: JP-A-10-89182

DISCLOSURE OF THE INVENTION

Problems that the Invention is to Solve

However, there has arisen a problem that the responsivity of the float becomes worse when the float is increased in weight. In a case where the level of the liquid surface of the fuel rapidly moves up due to rattling of the vehicle, leaning thereof, overturning thereof, or others, the float does not swiftly respond, thereby causing a fuel leakage.

An object of the present invention is to solve the above-described problems of the conventional technologies, and to provide a highly reliable float valve with no possibility of fuel leakages which exhausts the fuel gas with efficiency, stabilizes the open/close valve characteristics by opening with certainty when the liquid surface is lowered, and increases the responsivity of the float even if the level of the liquid surface of the fuel rapidly moves up due to rattling of the vehicle, leaning thereof, overturning thereof, or others.

Means for Solving the Problems

In order to achieve the above object, a float valve of the present invention is characterized in including: a case having a space formed inside; a connection hole that is formed on the side surface or on the bottom surface of the case to connect inside and outside of the case; a first valve port that is formed on the upper surface of the case; a second valve port that is formed on the upper surface of the case to have a larger diameter than that of the first valve port; a float to be housed in the case to freely move therein; a first valve body portion that is formed on the upper surface of the float to close the first valve port; a sub float through which the first valve body portion goes, and is covered over the upper surface of the float; and a second valve body portion that is formed on the upper surface of the sub float to close the second valve port.

According to a preferable embodiment of the present invention, it is characterized in including a spring that biases upward the sub float in such a manner as to keep balance with the second valve body portion opened.

According to another preferably embodiment of the present invention, it is characterized in including a spring that biases upward the sub float in such a manner as not to add a load from the sub float to the float.

Advantage of the Invention

As described in the foregoing, according to the float valve of the present invention, it is possible to provide a highly reliable float valve with no possibility of fuel leakages with which the fuel gas is exhausted with efficiency with a valve port of a larger diameter, the attachment phenomenon is prevented from occurring to the valve port of a valve body portion to stabilize the open/close valve characteristics by making it open with certainty when the liquid surface is lowered, and moreover, the responsivity of the float is increased even if the level of the liquid surface of the fuel rapidly moves up due to rattling of a vehicle, leaning thereof, overturning thereof, or others.

BEST MODE FOR CARRYING OUT THE INVENTION

In the below, by referring to the accompanying drawings, a preferred embodiment of the present invention is described in detail byway of example. Note here that the scope of the invention is not restricted to the dimension, material, shape, and relative placement of components described in this embodiment unless otherwise specifically stated.

FIG. 1 is a cross sectional view of a float valve 10 according to the embodiment of the present invention.

The float valve 10 is attached to the upper part of a fuel tank 20. The upper surface of the float valve 10 is connected with an end of a connecting pipe, which is not shown, for connection with a canister, which is not shown, to guide fuel gas to be generated in the fuel tank to the canister.

As shown in FIG. 1, the float valve 10 is provided with: a cylindrical case 11 having a space 13 formed inside; a first valve port 12 that is drilled at the center portion on the upper surface of the case 11; a second valve port 14 that is drilled at an end portion on the upper surface of the case 11 to be larger in diameter than the first valve port 12; a float 15 to be housed in the case 11 to freely move therein; a conical first valve body portion 16 that is formed to protrude from the center portion on the upper surface of the float 15 to close the first valve port 12; a substantially-cylindrical sub float 21 that has at its center portion an open port portion 19 through which the first valve body portion 16 goes, and is covered over the upper surface of the float 15; a second valve body portion 22 that is formed to protrude from an end portion on the upper surface of the sub float 21 to close the second valve port 14; a first connection hole 18 that is formed on the outer side surface of the case 11; and a second connection hole 23 that is drilled to the lower surface of the case 11 to connect the space 13 and inside of the fuel tank 20.

The first valve port 12 is formed with, on the side of the space 13, a first valve seat 12a in the wider-bottom shape, and the first valve seat 12a abuts the outer peripheral surface of the first valve body portion 16 with airtightness maintained therewith. With such a structure, even if the float valve 10 tilts, it can be adjusted by center so that the valve port 12 can be securely sealed even it is in the tilted state.

The second valve port 14 is formed with, on the side of the space 13, a second valve seat 14a in the wider-bottom shape, and the second valve seat 14a abuts the outer peripheral surface of the substantially-hemispherical second valve body portion 22 with airtightness maintained therewith. Accordingly, similarly to the first valve port 12, even if the float valve 10 tilts, it can be adjusted by center so that the valve port 14 can be securely sealed.

Moreover, assuming that the diameter (seal diameter) of the first valve port 12 is X, and the diameter (seal diameter) of the second valve port 14 is Y, a setting is so made as to satisfy Y>X as described above.

The float 15 includes a flange portion 15a whose upper surface is protruding in the diameter direction, and is formed also with a groove portion 15b that extends in the circumferential direction of the outer peripheral surface of the float 15, which is located lower than the flange portion 15a.

What is more, at the lower position of the sub float 21, a latch portion 21a protruding inside in the diameter direction from the rim of the sub float 21 is plurally formed at regular intervals in the circumferential direction of the sub float 21. Those can be latched by the flange portion 15a as the latch portion 21a moves in the vertical direction in the groove portion 15b that is formed on the outer peripheral surface of the float 15.

The second valve body portion 22 is provided with an axis portion 24 that goes through the second valve port 14 and is protruding upward. At the tip of the axis portion 24, a retainer portion 26 is attached.

The with-bottom-cylindrical retainer portion 26 engages with the tip of the axis portion 24 on the open port side. The bottom surface side of the retainer portion 26 protrudes in the diameter direction so that a flange portion 26a is formed.

On the rim of the retainer portion 26, a spring (coil spring) 27 is so placed as to be sandwiched between the flange portion 26a and the upper surface of the case 11, and biases upward the second valve body portion 22 and the sub float 21 that is formed to be a piece with the second valve body portion 22 in such a manner that the load from the sub float 21 is not added to the float 15.

Moreover, inside of the float 15, a concave space is formed, and in the concave space, a float spring 17 is placed. The float spring 17 biases the float 15 upward to adjust the buoyant force of the float 15. Herein, with respect to the load of the float 15, with the upright float 15, a spring constant of the float spring 17 is so set as not to push upward the float 15 unless the buoyant force acts on the float 15.

As such, by the coil spring 27 that biases upward the sub float 21, the load of the sub float 21 is not added to the float 15. Therefore, the sub float 21 does not push down the float 15 and the valve body portion 16 so that the valve body portion 16 is not degraded in the sealing capability.

Moreover, when the float 15 is at least located at the lowest position, the sub float 21 is biased upward in the state that the coil spring 27 is opening the valve body portion 22 to maintain the balance with the load of the sub float 21.

As a result, the open/close valve characteristics of the second valve port 14 are not affected by the weight of the valve body portion 22 and the sub float 21 and that of the retainer portion 26 any more.

FIG. 2 is a diagram showing the details of the sub float 21. FIG. 2(a) is a top view, FIG. 2(b) is a front view, and FIG. 2(c) is a bottom view, respectively.

The base portion of the valve body portion 22 on the side of the sub float 21 is formed with a rib 22a that extends in the vertical direction at predetermined intervals in the circumferential direction. On the side of the back surface of the sub float 21, a rib 21b is formed so that the back surface of the sub float 21 keeps a slight space with the upper surface of the float 15. With such a structure, the fuel gas can flow among the ribs 22a that are formed on the rim of the valve body portion 22, and between the upper surface of the float 15 and the back surface of the sub float 21.

Described next is the movement of the float valve 10 of the above structure by referring to FIGS. 1, 3, and 4.

FIG. 1 shows a case where a fuel level L1 is located below the lower surface of the float valve 10, and for example, the initial state of fuel supply applies to this state.

In this case, because the fuel level is lower than the lower surface of the float 15, the float 15 is in such a state as abutting the lower surface of the case 11 in the space 13 due to its self weight. Therefore, the first valve body portion 16 and the second valve body portion 22 are both in the open state, and the open port portion can be reserved sufficiently due to the valve port 12 and the valve port 14. Thus, the fuel gas in the fuel tank 20 can go through from the first connection hole 18 to the respective valve ports 12 and 14 to be exhausted toward the canister with efficiency.

FIG. 3 shows a case where a fuel level L2 reaches at a lower position of the first vent 18 by rattling of the vehicle, leaning thereof, overturning thereof, fuel supply, or others.

In this case, the fuel flows from the second connection hole 23 into the case 11, and the float 15 moves upward by receiving the buoyant force so that the first valve body portion 16 closes the first valve port 12. At this time, the coil spring 27 is biasing the sub float 21 upward, and thus the load of the sub float 21 is not directly added to the float 15. Therefore, even in such a case where the liquid surface of the fuel rapidly moves up, the float 15 is increased in responsivity, and the valve port 12 is closed with certainty so that the fuel leakage can be prevented.

What is more, the sub float 21 moves up in response to the up movement of the float 15, and the second valve body portion 22 moves in the direction of closing the second valve port 14. Then, when the second valve body portion 22 comes closer to the valve seat 14a of the second valve port 14, the resistance of the passage is increased for the fuel gas to flow thereinto. Once the passage resistance exceeds a predetermined range, the suction force acts on the second valve body portion 22, and due to the suction force, the second valve body portion 22 is moved up. As shown in FIG. 3, the second valve port 14 is thus put into the closed state.

At this time, the sub float 21 can be reduced in size and weight due to the reasons that it is so shaped as to be covered over the upper surface of the float 15, and there is no more need to consider the buoyant force by the fuel. Therefore, even if the liquid surface of the fuel is rapidly moved up, the sub float 21 is increased in responsivity, and the valve port 14 is closed with certainty so that the fuel leakage can be prevented.

Here, in order to prevent the rapid pressure increase in the fuel tank 20 resulted from the rapid closing of the float valve at the time of fuel supply or others, it is desirable to prevent the rapid pressure increase in the fuel tank 20 by first utilizing the above-described suction force to move up the second valve body portion 22 and close the second valve port 14, and then by closing the first valve port 12 in accordance with the prescribed setting to operate both the valve body portions 16 and 22 in stages.

FIG. 4 shows a case where a fuel level L3 moves down at the lower position of the float 15 when there is no more rattling or leaning of the vehicle, when the fuel is consumed, or others.

In this case, the float 15 moves downward as the liquid surface goes down. The first valve port 12 is so set as to have the smaller seal diameter X compared with that of the second valve port 14. Because the pressure reception area of the first valve body port 16 is small, the attachment force of the first valve body portion 16 with respect to the valve seat 12a is reduced. It thus becomes possible to open the first valve port 12 as the float 15 moves downward without increasing the weight of the float 15.

After the first valve port 12 is opened, the pressure difference is reduced between inside of the fuel tank 20 and the connecting pipe on the side of the canister, and the attachment force acting on the second valve body portion 22 is also reduced. Then, as the float 15 moves down, the flange portion 15a engages with the latch portion 21a so that the sub float 21 is moved down. In this manner the second valve body portion 22 is opened.

As a result, it is possible to go through the operation of opening the second valve port 14 that is larger in diameter than the first valve port 12 without increasing the weight of the sub float 21.

As such, the pressure (re-open valve pressure) required to fully open the valve of the float valve 10 can be set on the side of the first valve body portion 16. Thus, instead of increasing the weight of the float 15, the first valve body portion 16 is reduced in attachment force with respect to the valve seat 12a by reducing the seal diameter X of the first valve port 12 so as to open with certainty when the liquid surface moves down, thereby stabilizing the open/close valve characteristics. Moreover, by increasing the seal diameter Y of the second valve port 14, the fuel gas in the fuel tank 20 can be exhausted toward the canister with efficiency.

What is more, the float 15 is separately provided with the sub float 21, and as described above, the re-open valve pressure can be set in the first valve body portion 16 in which the attachment force is small with respect to the valve seat 12a. Accordingly, it becomes possible to reduce the weight of both the float 15 and the sub float 22 while maintaining the stable open/close valve characteristics of the first valve body portion 16 and the second valve body portion 22. Even if the liquid surface of the fuel rapidly moves up, the responsivity of the float 15 and the sub float 21 is increased so that the respective valve ports can be closed with certainty. As such, the fuel leakage can be favorably prevented.

BRIEF DESCRIPTION OF THE DRAWINGS

FIG. 1 is a diagram showing a cross sectional view of a float valve according to the present embodiment.

DESCRIPTION OF REFERENCE NUMERALS

Figure 2A:
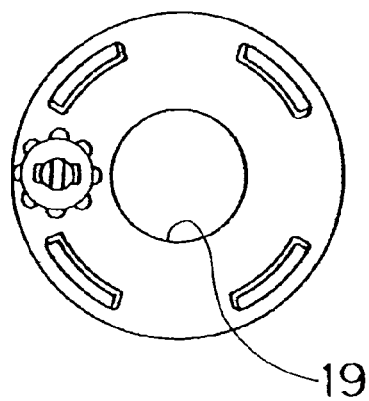
FIG. 2 is a diagram showing the details of a sub float.
Figure 2B:
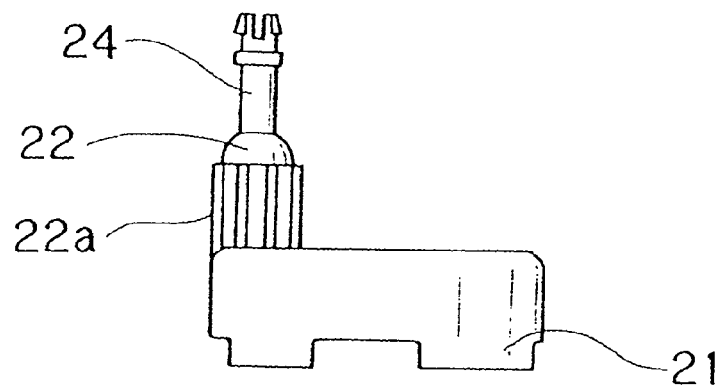
Figure 2C:
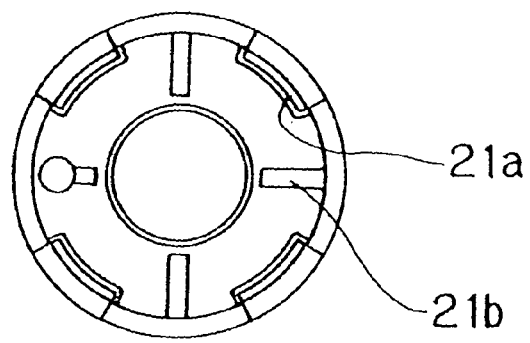
Figure 3:
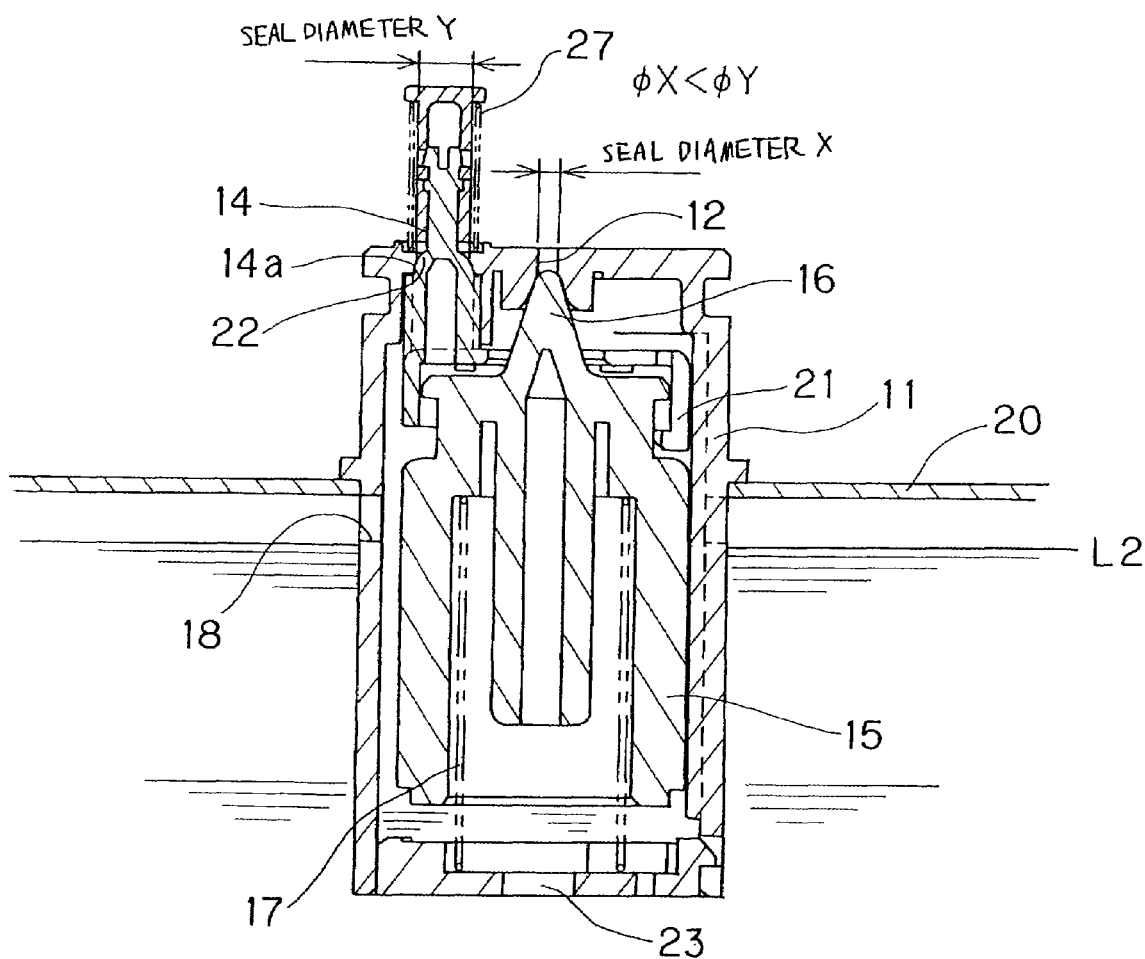
FIG. 3 is a diagram showing a cross sectional view of the float valve of the present embodiment.
Figure 4:
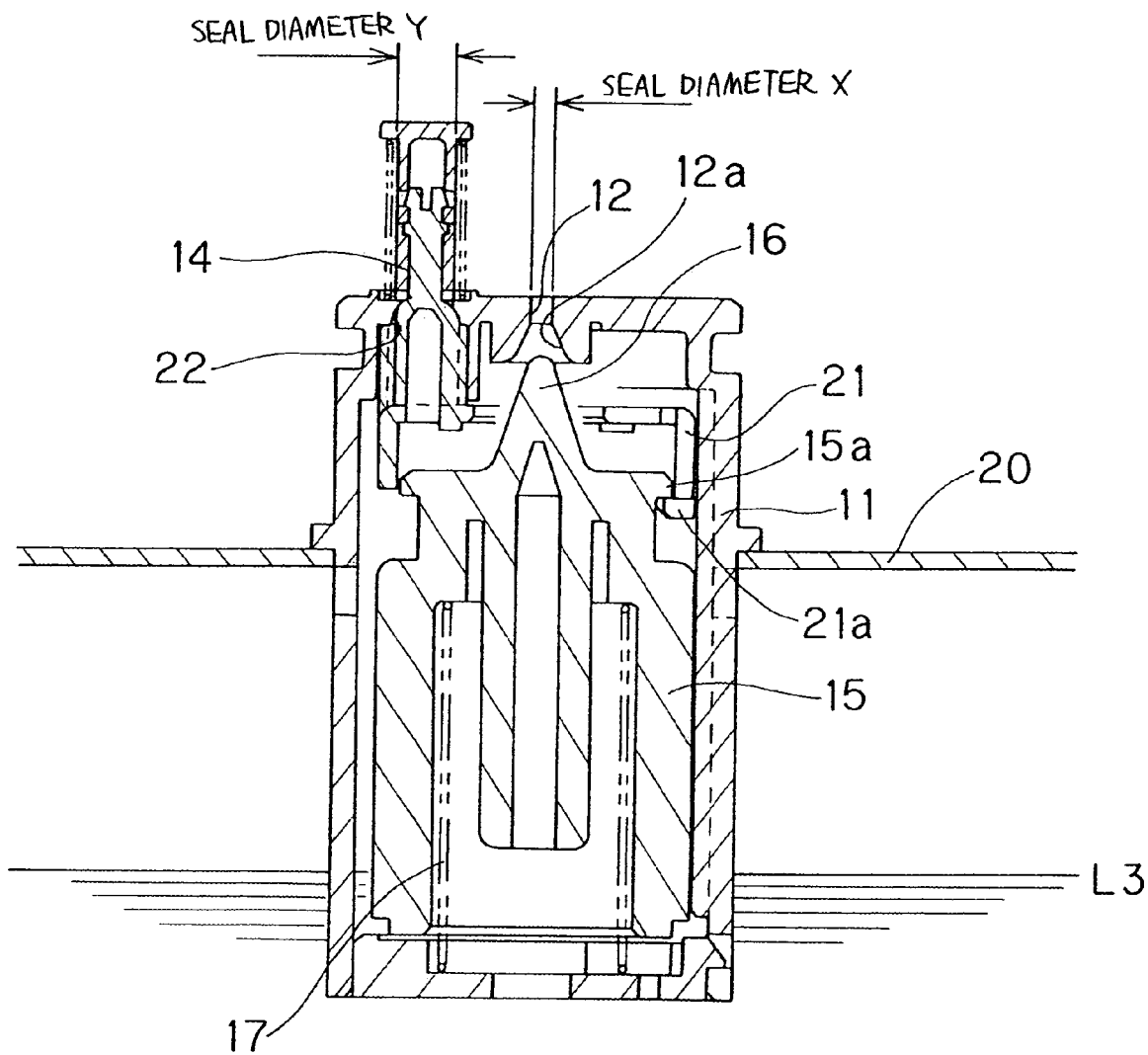
FIG. 4 is a diagram showing a cross sectional view of the float valve of the present embodiment.
Figure 5:
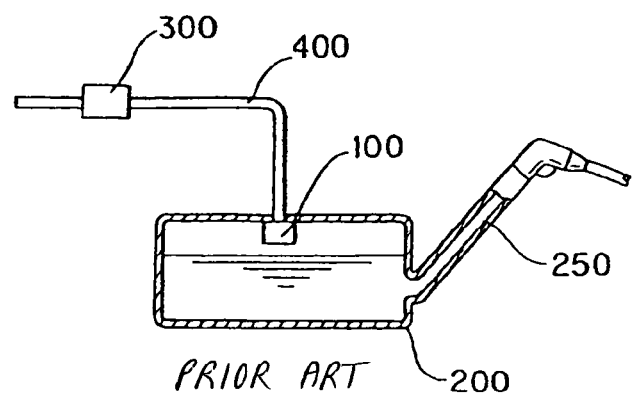
FIG. 5 is a cross sectional diagram showing the positional relationship among a fuel tank, the float valve, and a canister.
Figure 6:
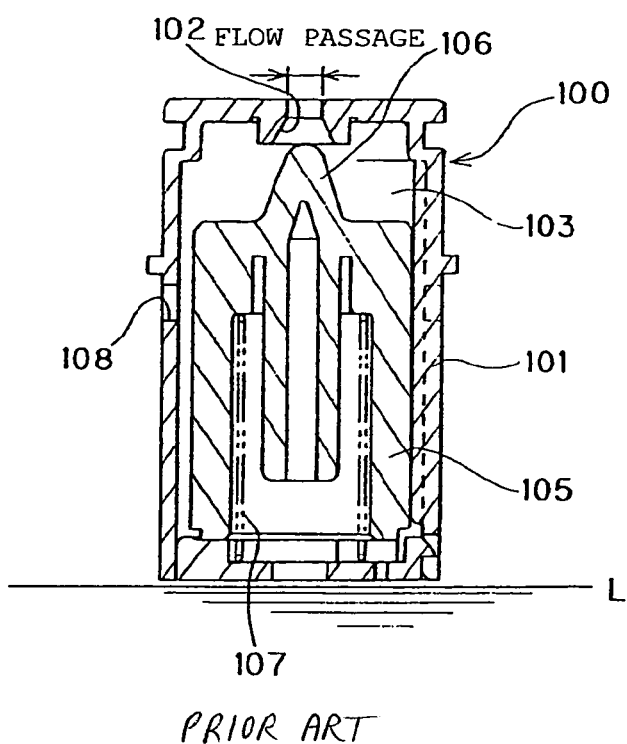
FIG. 6 is a diagram showing a cross sectional view of a conventional float valve.

10 . . . float valve
11 . . . case
12 . . . first valve port
13 . . . space
14 . . . second valve port
15 . . . float

16 ... first valve body portion
21 ... sub float
22 ... second valve body portion
27 ... spring (coil spring)

The invention claimed is:

1. A float valve comprising:

a case having a space formed inside;

a connection hole that is formed on a side surface or on a bottom surface of the case to connect inside and outside of the case;

a first valve port that is formed on an upper surface of the case;

a second valve port that is formed on the surface of the case to have a larger diameter than that of the first valve port;

a float to be housed in the case to freely move therein;

a first valve body portion that is formed on an upper surface of the float to close the first valve port;

a sub float having an opening portion through which the first valve body portion goes, and is covered over the upper surface of the float in a state where the first valve body portion passes through the opening portion; and a second valve body portion that is formed on an upper surface of the sub float to close the second valve port, the second valve body portion being provided with an axis portion extending through the second valve port and protruding upwardly;

a retainer portion engaging with the axis portion mounted on the upper surface side of the case, and a spring disposed on the retainer portion to bias the sub float upwardly in such a manner that a load from the sub float is not added to the float.

* * * * *